July 28, 1964   O. WILD, JR   3,142,442
RESETTING MECHANISM FOR COUNTERS
Filed Oct. 4, 1961   4 Sheets-Sheet 1

INVENTOR.
OTTO WILD JR.

BY
*Lindsey, Crutzman and Hayes*

ATTORNEYS

July 28, 1964        O. WILD, JR        3,142,442

RESETTING MECHANISM FOR COUNTERS

Filed Oct. 4, 1961        4 Sheets-Sheet 3

INVENTOR.
OTTO WILD JR.

BY
Lindsey, Prutzman and Hayes
ATTORNEYS

United States Patent Office 3,142,442
Patented July 28, 1964

3,142,442
RESETTING MECHANISM FOR COUNTERS
Otto Wild, Jr., West Hartford, Conn., assignor to Veeder-Root Incorporated, Hartford, Conn., a corporation of Connecticut
Filed Oct. 4, 1961, Ser. No. 142,905
21 Claims. (Cl. 235—144)

The present invention relates generally to counting devices and is concerned more particularly with a resetting mechanism for counters or registers. While not limited thereto, the invention has particular utility in connection with counters of the type designed for registering the volume and cost of liquid dispensed, such as may be utilized in a gasoline station.

It is an object of the invention to provide an improved resetting mechanism for counters whereby the operation of the counter and particularly the resetting function is rendered more convenient for the operator. Included in this object is the provision of a resetting mechanism requiring a minimum of effort and control by the operator which is relatively foolproof in operation and which can be operated with a minimum of instruction and skill.

A further object is to provide an improved resetting mechanism which is particularly suitable for remote indicating installations such as would be the case when the register is located a distance from the apparatus whose function it is registering, and particularly in those situations where the register is not conveniently accessible to the operator. A specific example of such an installation would be in a gasoline station of the type where the register is removed from the pump and installed at some other location, such as a separate viewing station or a central office.

A more specific object is to provide a resetting mechanism of the type referred to which is of rugged design and capable of long usage without undue wear or need for repair and replacement and yet which is compact and of small size and having a minimum of parts so that it may be incorporated with existing counters even though the space available may be generally limited. Included in this aim is the provision of a resetting mechanism which can be easily assembled and installed and may be easily connected for the specific type of operation desired. Also included in this aim is the provision of a resetting mechanism having its own power supply and power controls housed in a convenient and safe manner thereby providing a mechanism which will meet the needs of practical commercial usage and at the same time comply with requirements such as with respect to safety and accuracy.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1:
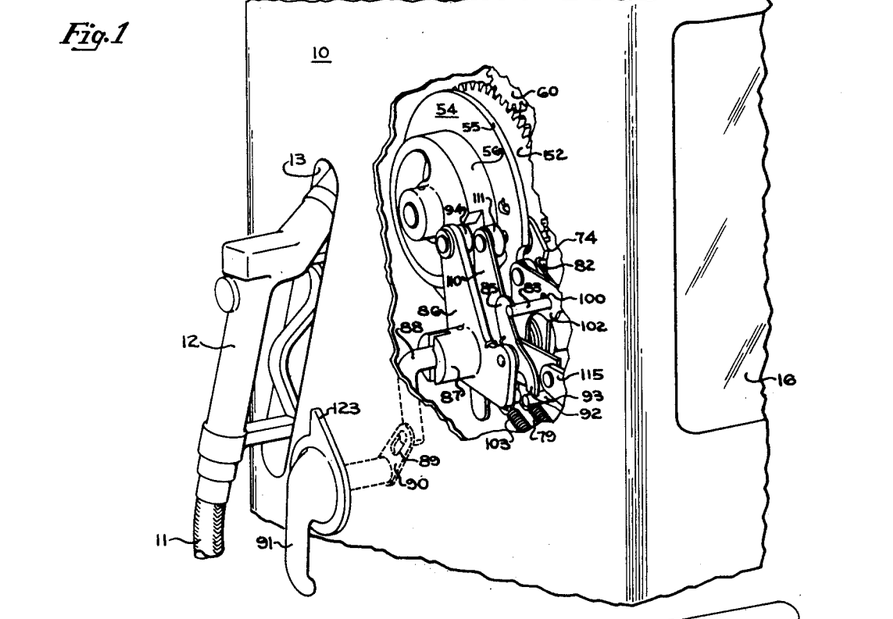
FIG. 1 is a fragmentary perspective view of a gasoline pump or dispensing apparatus as utilized in a gasoline station, the housing being partially cut away to show certain of the operating parts of the resetting mechanism.
Figure 2:
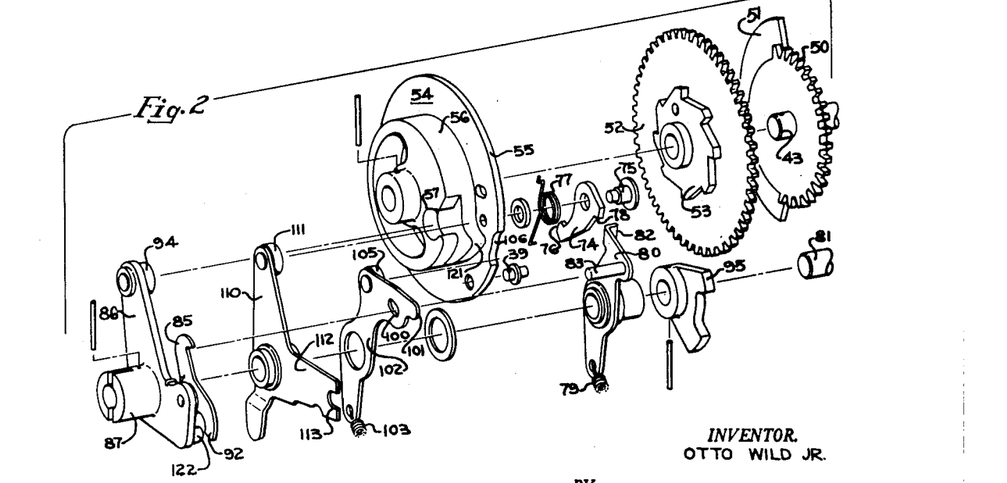
FIG. 2 is an exploded perspective view of the principal operating parts of the resetting mechanism.

Referring to the drawings in detail, the housing of a conventional gasoline dispensing apparatus is denoted at 10 and as shown in FIG. 1 of the drawings, the apparatus is provided with a delivery hose 11 fitted at its outer end with a dispensing nozzle 12 which is adapted to be seated in the opening 13 when the apparatus is not in use. The dispensing apparatus is provided with a register 14 for indicating the cost and the volume of the liquid dispensed during each dispensing operation.

In the embodiment as shown in the drawings, the register 14 is of the type shown and claimed in the Bliss Patent No. 2,814,444, issued November 26, 1957. For simplicity and brevity of presentation, only those portions of the register will be described here as may be required for an understanding of the present invention. In the event that additional details of the register are desired, reference may be had to the aforesaid Bliss patent.

Figure 3:
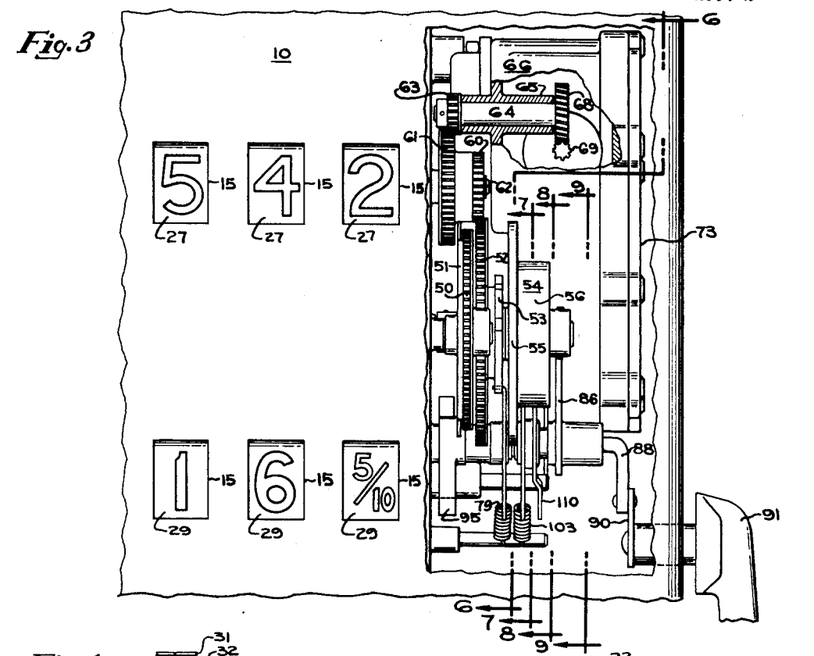
FIG. 3 is a fragmentary end view of a gasoline dispensing apparatus with the housing partially cut away to show the resetting mechanism.
Figure 4:
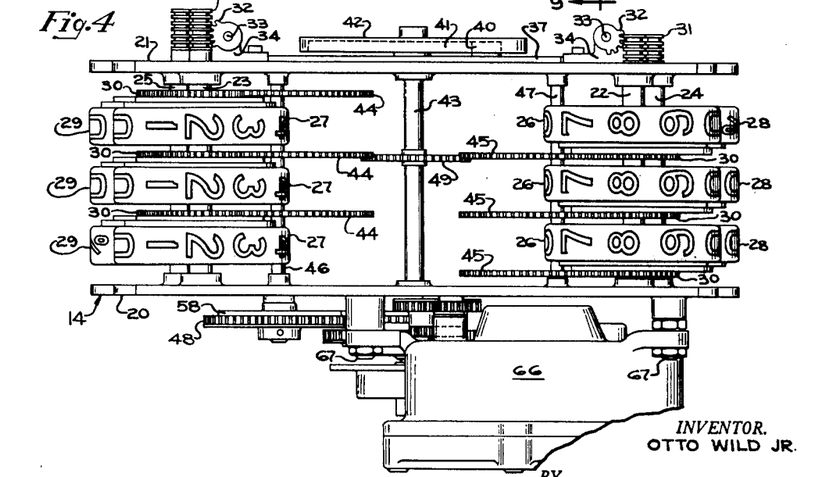
FIG. 4 is a fragmentary top view of the register and resetting mechanism.

The register 14 has a frame comprising the side plates 20, 21 in which are journaled the number wheel supporting shafts 22, 23, 24 and 25. The number wheel shafts 22 and 23 support the sets of number wheels 26 and 27, respectively, for rotation thereon, which sets of number wheels register the cost of the liquid dispensed and which will be hereinafter referred to as the cost wheels. As will be apparent, the set of cost wheels 27 registering with the apertures 15 as shown in FIG. 3 will be viewed from one end of a dispensing mechanism while the other set of number wheels will be viewed from the opposite end through the window 16. Similarly, the wheel supporting shafts 24 and 25 support the sets of number wheels 28 and 29, respectively, which register the gallonage or quantity of the liquid dispensed and which will be hereinafter referred to as the quantity number wheels. As in the case of the cost wheels, the two sets of quantity number wheels are provided so that the register may be viewed from either end of the dispensing mechanism.

For simplicity of presentation, the driving mechanism for the lowest order counter wheels and the transfer mechanism to the higher order number wheels by means of which the number wheels are advanced to indicate or register the quantity and cost of the liquid dispensed have been omitted from the drawings. The driving mechanism forms no part of the present invention and details may be had by reference to the aforesaid Bliss Patent No. 2,814,444. The resetting mechanism for the counter wheels by means of which the counter wheels are returned to zero position after a dispensing operation includes a plurality of resetting gears 30, each positioned in juxtaposition to one of the individual number wheels. The number wheels supporting shafts 22-25 are mounted for limited longitudinal or axial sliding movement, which movement is utilized as to connect the number wheels either to the drive mechanism (not shown) or to the individual resetting gears 30. In the position of the shafts shown in the drawings, the shafts are in the shifted position for a counting or registering operation and the number wheels are disconnected from the resetting gears 30.

Figure 5:
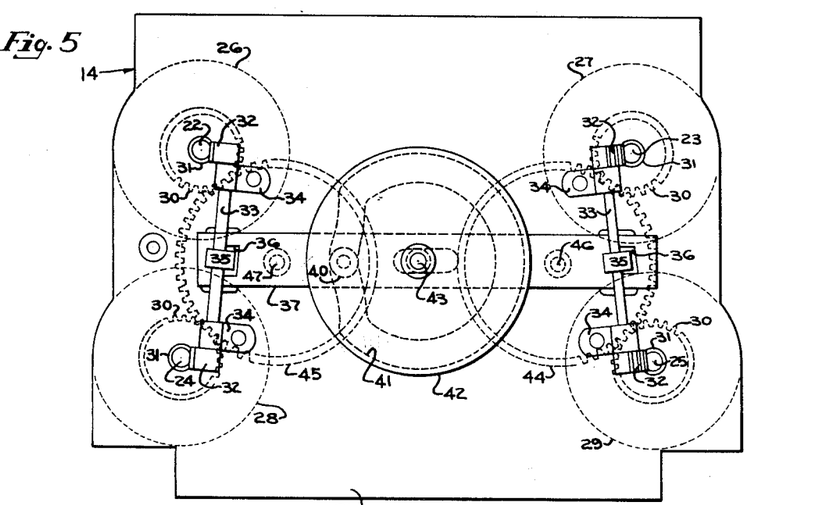
FIG. 5 is a side view of the register taken from the side opposite the resetting mechanism.

In order to shift the number wheel shafts 22–25 to condition the register for either a counting or a resetting operation, each shaft is provided at its end with a series of circumferential ribs 31. The ribs 31 of the shafts mesh with gear segments 32 fixed to the opposite ends of the generally upright shafts 33 which are journaled in brackets 34 on the side plate 21. Each shaft 33 has a pawl 35 fixed thereto intermediate its ends, which pawls are engaged in slots 36 in an elongated plate 37 hereinafter referred to as a slide which is mounted for sliding movement longitudinally of the register on the side plate 21. The slide plate 37 has a follower 40 which is engaged in a track 41 of a plate cam 42 and actuated thereby. The plate cam 42 is fixed to the end of a transverse shaft 43 journaled in the side plates 20, 21 and which for convenience will be referred to hereinafter as the main reset shaft. The configuration of the track 41 of the plate cam 42 is such that when the parts are in the position shown in the drawings, the number wheel shafts 22–25 are in the registering position; however, when the plate cam 42 is turned sufficiently by main reset shaft 43 to cause the follower 40 to be cammed into the constant radius (circular) portion of the track 41, this will cause the slide plate 37 to shift to the left as viewed in FIG. 5 of the drawings, which, in turn, through the pawls 35 causes turning of the shafts 33 and a consequent shifting of the number wheel shafts 22–25 sufficient to disengage the number wheels from the driving mechanism and to connect them to the resetting gears 30.

During a resetting operation, the resetting gears 30 are adapted to be rotated by auxiliary resetting gears 44, 45 which are fixed to the transverse rotatable shafts 46 and 47, respectively. The shaft 46 is driven by a gear 48 fixed to the outer end thereof and turning movement is transferred across to the shaft 47 by means of an idler gear 49 freely mounted on the main reset shaft 43 and meshing with one of the auxiliary resetting gears 44 and one of the auxiliary resetting gears 45. As will be apparent from the foregoing description, resetting of the register may be accomplished when desired by turning the main reset shaft 43 which causes the number wheel supporting shafts 22–25 to be shifted to resetting position and thereafter turning the gear 48, hereinafter referred to as the main resetting gear, which in turn, will cause turning movement of the auxiliary resetting gears 44, 45 and through these the individual resetting gears 30. A complete rotation of the main reset shaft 43 will, of course, return the parts to the position shown in the drawings wherein the number wheel shafts 22–25 have been returned to the shifted position conditioning the register for a registering or counting operation.

Turning now to the external power and control mechanism for carrying out the resetting operation, which mechanism is mounted on the side plate 20, it will be noted that there are three rotatable assemblies mounted on the main reset shaft 43. The first or innermost of these which is fixed to the shaft 43 is a combination resetting gear segment 50 and a locking disc segment 51. The next or intermediate unit is a spur gear 52 which is freely rotatable on the shaft 43, and a toothed ratchet wheel 53 fixed to the outer face of the spur gear 52. The outer unit 54, which will be referred to hereinafter as the control unit, is fixed to the shaft 43 and consists of a notched plate 55 and a drum-like hub portion 56.

Figure 6:
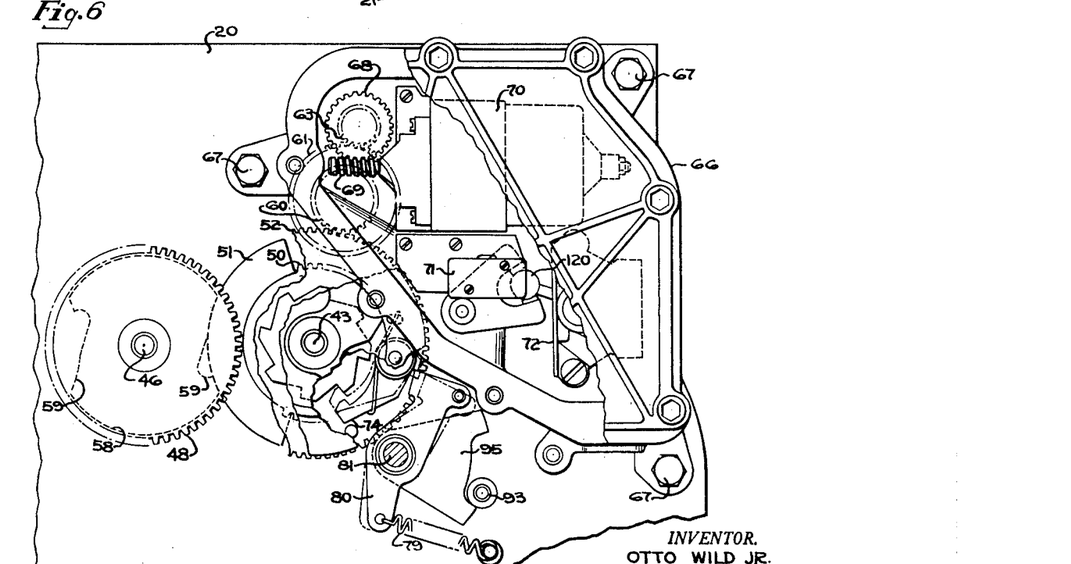
FIG. 6 is a fragmentary side view of the register showing the resetting mechanism.

The innermost unit comprises the gear segment 50 and locking disc segment 51 which cooperate, respectively, with the main resetting gear 48 and a locking plate 58 fixed to the inner face of gear 48. The locking plate 58 is formed with irregularly shaped notches 59 diametrically disposed for receiving the locking disc segment 51. In the at-rest position shown in FIG. 6, the center portion of segment 51 is engaged in one of the notches 59, thus locking the gear 48 against turning and the gear segment 50 is out of mesh with gear 48. Assuming that the unit comprising the gear segment 50 and locking segment 51 are turned in a clockwise direction, slightly less than one-quarter turn will be required to cause meshing of the gear segment 50 with the gear 48 and withdrawal of the locking segment 51 from the notch 59. The irregular configuration of the notch 59 permits clearance for the trailing edge of the locking segment 51 as the gear segment 50 begins to drive the main resetting gear 48. Continued turning movement of the segment unit will then drive the main resetting gear 48 one-half turn, whereupon the gear segment 50 will pass out of mesh with the main resetting gear and the locking segment 51 will enter the second notch 59 to again lock the main resetting gear 48 against movement. The segment unit can then continue to complete a full turn, thus returning to initial position.

The intermediate unit comprises the freely mounted spur gear 52 which is in continuous mesh with a pinion 60 which is fixed to the hub of a larger gear 61, the two gears being freely rotatable in unison on the stud 62 extending outwardly from the side plate 20. The gear 61, in turn, meshes with a pinion 63 which is fixed to the inner end of a shaft 64 which is journaled in a bearing formed in the boss 65 of the base of a sparkproof housing 66 which is secured by means of bolts 67 to the side plate 20. The end of the shaft 64 within the housing 66 has fixed thereto a worm wheel 68 which, in turn, meshes with and is driven by a worm 69 fixed to the shaft of an electric motor 70 hereinafter referred to as the reset motor. The operation of the reset motor 70 is controlled by a reset motor switch 71 also mounted within the housing 66. A toggle switch 72 also mounted within the housing is utilized to control the operation of the pump motor (not shown) of the dispensing apparatus. The housing 66 is normally sealed by means of a detachable cover plate 73. It is a particular advantage of this construction that the reset motor 70 and switches 71 and 72 with their wiring connections (not shown) are all contained within the explosion-proof housing 66 which is removable as a unit from the side plate 20 of the register. As a result, whenever the register 14 requires servicing or replacement, it is necessary only to disconnect and remove the housing 66 as a unit which is only a mechanical operation and does not require the services of an electrician.

Motion is transmitted from the gear 52 to the main control unit 54 by means of a pawl 74 which is pivotally mounted on a stud 75 on the inner face of the notched plate 55 and so located that the nose 76 thereon will engage with the teeth of the ratchet wheel 53, it being understood that when the reset motor 70 is operated, the gear 52 is rotated in a clockwise direction as viewed in the drawings. The pawl 74 is biased into engaging position by the spring 77 and, in effect, operates as a disengageable clutch. Rotation of the main control unit 54 which is fixed to the main reset shaft 43 will, of course, cause rotation of the main reset shaft 43 and of the resetting gear segment 50 and locking disc segment 51, which also are fixed to the shaft 43.

Disengagement of the pawl 74 from the ratchet wheel 53 is effected by a lever 80 which is freely mounted on the stub shaft 81 and biased toward pawl 74 by a spring 79. The lever 80 has a flange 82 at one end thereof which is adapted to engage under the ear 78 of the pawl 74 and thus as the control mechanism is rotating in a clockwise direction, the pawl 74 will automatically be picked up by the lever 80 and moved out of engagement with the ratchet wheel 53 when the control unit 54 reaches the position shown in FIG. 6 of the drawings. Stud 39 is a stop to limit outward pivoting movement of pawl 74. In order to engage the pawl 74 with the ratchet wheel 53 to initiate turning movement of control unit 54, the lever 80 is pivoted in a clockwise direction and for this purpose the lever 80 is provided with a pin 83 extending parallel to the hub. The pin 83 is adapted to be engaged by a catch 85 pivotally mounted on a lever 86 having a hub 87 secured to the shaft 81. The hub 87 is in the form of a coupling for receiving an operating rod 88 which is secured at its outer end by means of the pin and slot connection 89 with a link 90 secured to the hub of a control handle 91 which is positioned on the outside of the housing 10 for manual actuation by the operator.

Figure 9:
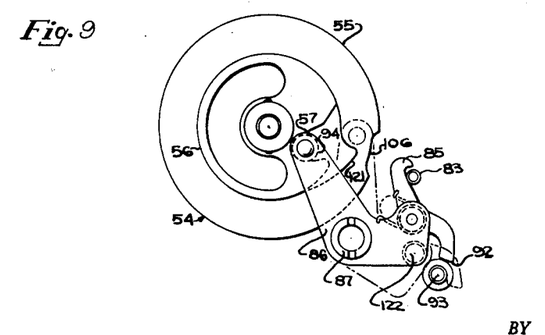
FIG. 9 is a fragmentary view of the resetting mechanism partly in cross section taken along the line 9—9 of FIG. 3.

As will be apparent from the foregoing description, when the control handle 91 is turned in a counter-clockwise direction as viewed in FIG. 1, the lever 86 will be pivoted sufficiently in a clockwise direction so that the biased catch 85 will pull downwardly on the pin 83 as illustrated in solid lines in FIG. 9 of the drawings thus disengaging the lever 80 from the pawl 74. As soon as the flange 82 on the lever 80 clears the ear 78 on the pawl, which occurs when lever 80 has moved to the dotted-line position shown in FIG. 6 of the drawings, the pawl 74 will immediately pivot under the influence of its spring 77 to the engaging position with ratchet wheel 53 also shown in dotted lines in FIG. 6 of the drawings. Upon completion of the turning movement of lever 86, the tail 92 of the catch 85 will engage the stud 93 and will thus be pivoted to a position disengaging the pin 83 as shown in dotted lines in FIG. 9 and freeing lever 80 for return movement to latching position under the influence of spring 79. When this occurs, however, lever 80 will not be able to return to latching position until sufficient turning movement has been imparted to the main control member 54 to move the pawl 74 beyond the end of the lever 80. As shown in dotted lines in FIG. 6 of the drawings, release of the pawl 74 by the lever 80 causes the ear 78 to move in front of the flange 82 thus effectively blocking return movement of the lever 80 and delaying the return movement of lever 80 into engaging position until there has been a predetermined minimum rotational movement of control member 54. Upon completion of one turn of control member 54, the released lever 80 will again engage with its flange 82 beneath the ear 78 of the pawl 74 thus camming the pawl 74 to a position releasing the ratchet wheel 53 and effectively limiting turning movement of the control unit and hence, the shaft 43 to one turn. Upon such release, continued movement of the gear 52 carrying the ratchet wheel 53 is not prevented which permits overrunning of the reset motor as will be described more particularly hereinafter.

When the lever 86 is pivotally rotated in a clockwise direction as previously described, the roller 94 thereon is removed from the notch 57 in hub 56 in which it is normally positioned when the mechanism is at rest. Since pivoting of the lever 86 also causes pivoting of lever 80 which initiates rotation of the main control unit 54, the notch 57 will move out of registry with roller 94 and the periphery of the drum-like portion 56 by engagement with the roller 94 will prevent the lever 86 from being returned to original position until the main control unit 54 has completed a full turn, whereupon the notch 57 will again be in registry with the roller 94. As a result of this arrangement, the operator upon initiating a resetting operation cannot attempt to return the control handle 91 to original position to halt the operation until resetting has been completed. The bifurcated element 95 secured to the shaft 81 and which straddles the stud 93 provides a safety limit stop controlling the maximum distance that the control handle 91 may be turned by the operator.

Figure 7:
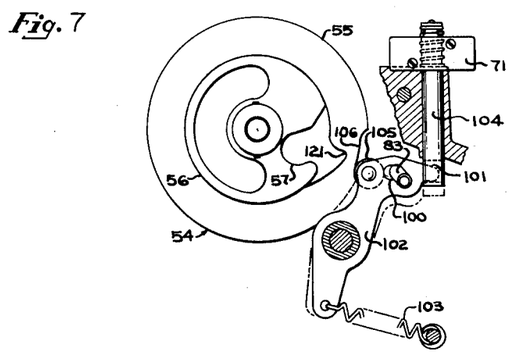
FIG. 7 is a fragmentary view of a portion of the resetting mechanism partly in cross section taken along the line 7—7 of FIG. 3.

The pin 83 extends through an elongated hole 100 in projection 101 of a lever 102 which also is mounted on the shaft 81 for pivoting movement and biased in a counterclockwise direction by spring 103. As best shown in FIG. 7 of the drawings, the projection 101 is engaged with the lower end of an operating or actuating post 104 for the reset motor switch 71, the arrangement being such that when the parts are in the solid-line position shown in FIG. 7, the reset motor is turned off and when the parts are in the dotted-line position, the reset motor is turned on. The pin 83 is located relative to the elongated hole 100 so that when lever 80 and lever 102 are in the normal at-rest position, the pin 83 engages the outermost or righthand edge of the hole 100. Accordingly, when the lever 80 is pivoted to release the pawl 74 for engagement with ratchet wheel 53, the lever 102 will also be pivoted and caused to move to the dotted-line position shown in FIG. 7 turning on the reset motor. Even though lever 80 is subsequently automatically released as previously described to permit it to return to position for reengaging pawl 74, such return movement is not prevented because the pin is free to move in the elongated hole 100. The lever 102 will not be released for return movement at the same time as lever 80 because of the roller 105 which is mounted for engagement with the rim of the notched plate 55. In the at-rest position of the parts, the roller 105 engages in the notch 106 as shown in solid lines in FIG. 7 but as soon as turning movement of plate 55 takes place, notch 106 no longer registers with roller 105 preventing return movement of lever 102 until one complete turn of plate 55 has been effected, whereupon roller 105 again drops into notch 106 due to the bias on lever 102 by spring 103 turning off the reset motor. Coasting of the reset motor after turn-off is of no concern because at this point the drive is disengaged by the engagement of lever 80 with pawl 74 which releases the ratchet wheel 53.

The remaining lever to be described is the pump motor control lever 110 also freely mounted on the stub shaft 81 and having a roller 111 cooperating with the hub 56 of the outer control unit 54. The extension 112 on control lever 110 has a notch 113 engaging with the pin 114 of a lever 115 fixed to a rotatable spindle 116 mounted on a bracket 117. The inner end of spindle 116 also has a lever (not shown) fixed thereon which is attached to the lower end of link 118 which, in turn, is operatively connected at its upper end to the pivoted yoke 119 in which is located the operating or actuating lever 120 of the toggle switch 72 which as previously described, controls the pump motor (not shown). The toggle switch 72 as its name implies, is internally biased so that it will remain in either the off or on position to which it is actuated until the bias is overcome by sufficient force applied to the actuating lever 120.

Figure 8:
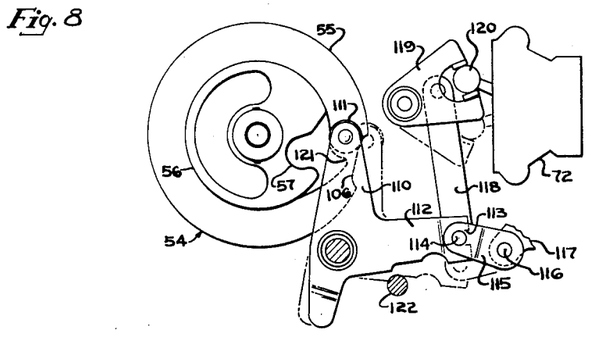
FIG. 8 is a fragmentary view of a portion of the resetting mechanism partly in cross section taken along the line 8—8 of FIG. 3.

In the solid-line position of the parts shown in FIG. 8 of the drawings, the pump motor switch is turned off, whereas in the dotted-line position it is turned on. The lever 110 may be automatically moved to the on position at the completion of a resetting operation by a projecting cam or promontory 121 on the hub 56 which is located so as to push the roller 111 and hence the lever 110 to the dotted-line or on position just prior to the completion of one turn of the main control unit 54. By this time the resetting will have been completed and the shafts 22–25 shifted to condition the register for a counting operation. As will be apparent, the automatic turning on of the pump motor at the completion of a resetting operation is an optional feature. It is contemplated that in most installations such an automatic operation will be desired, but in the event that it is not, then the lever 110 is merely shifted axially to move the roller 111 out of the orbit of the cam or promontory 121.

The pump motor switch is arranged to be turned off by the main control handle 91 by reason of the pin 122 on the lever 86. As previously described, the lever 86 is coupled for turning movement with the handle 91. Thus, when the handle 91 is turned to the position shown in FIG. 1, the lever 86 is returned to original starting position and the pin 122 engaging against the lower edge of extension 112 of control lever 110 pivots the latter in a counterclockwise direction thereby turning off the pump motor. The handle 91 may be provided with an interlock plate 123 so that it cannot be turned in a counterclockwise direction to the on position unless the nozzle 12 is first removed from its seat in the opening 13 and conversely, that the nozzle 12 cannot be returned to the opening 13 unless the handle 91 is returned to the off position shown in FIG. 1 of the drawings.

It is believed that the apparatus will be fully understood in the light of the above description together with the following brief summary of the sequence of operations which occur in the use thereof. Assuming that the apparatus is in the at-rest condition following a previous dispensing operation as shown in FIG. 1 of the drawings and the operator wishes to begin a subsequent dispensing operation, the operator will first remove the nozzle 12 from its seat in the opening 13 and turn the operating handle 91 in a counterclockwise direction approximately 90° to the on position. Turning of the handle 91 will through the linkages provided, pivot the lever 86 is a clockwise direction which causes the catch 85 mounted on lever 86 to engage the pin 83 on lever 80 which, in turn, will cause the lever 80 to pivot sufficiently to release the pawl 74 so as to interconnect the ratchet wheel 53 and hence the spur gear 52 with the main control unit 54. At the same time the pin 83 bearing against the end of the hole 100 in the lever 102 will pivot the lever 102 sufficiently to close the reset motor switch 71 thereby energizing the reset motor 70 which, as previously described, is in driving connection with the spur gear 52. The final portion of the movement of handle 91 will cause the catch 85 to be disengaged from the pin 83 by virtue of the catch 85 engaging against the stud 93; but by this time the reset motor will have been energized for a sufficient period to impart at least sufficient rotation to the gear 52 and control unit 54 so as to remove the notches of the control unit 54 out of registry with the rollers 94 and 105 of the levers 86 and 102, respectively. Accordingly, the operator will not be able thereafter to turn the handle 91 to the off position and lever 102 cannot move under the influence of its biasing spring to open the reset motor switch until resetting is complete.

Since turning of the main control unit 54 imparts turning movement to the main reset shaft 43 to which it is fixed, the first operation which takes place is longitudinal movement of the slide 37 by the cam 42 fixed to shaft 43 which, as previously described, shifts the wheel supporting shafts 22–25 to condition the register for a resetting operation and disconnects the number wheels from the counting drive train. After the cam 42 has been turned sufficiently to cause the said shifting movement of the shaft, the locking disc segment 51 on shaft 43 then clears the notch 59 of the locking plate 58 and the gear segment 50 meshes with the main resetting gear 30 thereby imparting turning movement to the shaft 46 which carries the auxiliary resetting gears 44 which, in turn, drive shaft 47 and auxiliary resetting gears 45 fixed therein. This turning movement of the auxiliary resetting gears continues until the number wheels are returned to zero position, whereupon the gear segment 50 moves out of mesh with the main resetting gear 48 and the locking disc 51 will again enter a notch 59 of the locking plate 58 to lock the resetting gears against further movement. After termination of the turning movement of the resetting gears, the main reset shaft 43 will continue to turn and the cam 42 will thereupon shift the slide 37 in the opposite direction to return the wheel supporting shafts 22–25 to the position for a registering operation and disconnecting the number wheels from the resetting mechanism. As this latter shifting movement is accomplished, the promontory 121 on the hub 56 of the control unit 54 will thereupon actuate the lever 110 to turn on the pump motor and the final operation will be the reengagement of lever 80 with the pawl 74 to disconnect the spur gear 52 from the control unit 54 which occurs when the control unit 54 and hence the main reset shaft 43 have made one complete turn. When the control unit 54 has made one complete turn, the notches thereof are now in alignment with the various rollers so that the lever 102 under the influence of its spring 103 will pivot in a counterclockwise direction to turn off the reset motor switch 71. Even though coasting of the reset motor may occur thereafter, this will present no problem because of the disengagement of the spur gear 52 from the control unit 54. Also, the operator will now be permitted to return the handle 91 to the off position which he can do immediately or at the end of the dispensing operation. When the handle 91 is returned to the off position, the pin 122 on lever 86 by engagement with the projection 112 on lever 110 will move the pump motor switch 72 to the off position thereby discontinuing operation of the pump motor.

As will be apparent, the mechanism provided for resetting the counter is of compact design and efficient in operation so that the proper sequence of operating movement is provided in an automatic manner to properly condition the register for a subsequent dispensing operation. The apparatus is of rugged structure and so designed as to be foolproof in operation and so that it will function effectively over long periods of time without the need for repair or replacement, and will comply with existing regulations having to do with safety and accuracy.

While a specific embodiment of the invention has been described in detail, variations and modifications within the skill of the art are intended to be included within the scope of the invention.

I claim:

1. A resetting mechanism for resettable counters comprising a rotary control unit adapted to be drivingly connected to the resetting means of a counter, a rotary drive unit coaxial with the control unit, means for rotating the rotary drive unit, a disengageable clutch between the control unit and drive unit comprising a pawl pivotally mounted on the control unit, means biasing the pawl into engagement with the drive unit, a control lever movable into position in the path of the pawl and engageable with the pawl in a predetermined rotated position of the control unit to pivot the pawl out of engagement with the drive unit, said control lever being movable to a retracted position releasing the pawl to initiate a resetting operation, and means on the pawl for engagement with the control lever to prevent return movement of the control lever from retracted position into stopping position.

2. In combination with a counter having first rotatable means for conditioning the counter alternately for a resetting operation and a registering operation and second rotatable means for zeroizing the number wheels, a resetting mechanism comprising a control unit connected to the first rotatable means, a gear segment and a diametrically arranged locking disc segment mounted for rotation with the control unit, a gear and locking plate mounted on the second rotatable means of the counter for engagement sequentially by the gear segment and locking disc segment whereby the second rotatable means is rotated by the first rotatable means while the counter is conditioned for resetting and locked against movement while the counter is conditioned for registering, driving means, a releasable clutch between the driving means and control unit, and means for releasing the clutch at the completion of a resetting operation.

3. A resetting mechanism for the counter of a gasoline dispensing mechanism comprising a reset motor, rotary means driven by the motor, a rotary control unit adapted to be secured to the reset shaft of a counter, disengageable clutch means between the rotary means and the control unit, reset initiating means for engaging the clutch means and energizing the reset motor, means responsive to the rotated position of the control unit for disengaging the clutch and deenergizing the reset motor at the completion of a resetting operation, a movable member for connection to a pump motor switch, and means on the control member for actuating the movable member at the completion of the resetting operation.

4. In combination with a counter having first resetting means for conditioning the counter alternately for a resetting operation and a registering operation and second resetting means operable when the counter is conditioned for a resetting operation to zeroize the number wheels, a resetting mechanism comprising power means, means forming a driving connection between the power means and said first resetting means including a clutch, an interrupted drive train between the power means and the second resetting means effective for driving the second resetting means only during an intermediate portion of the movement of the first resetting means, means for energizing the power means, and means responsive to predetermine movement of the first resetting means for subsequently deenergizing the power means.

5. In combination with a counter having a first rotatable element for conditioning the counter alternately for a resetting operation and a registering operation and a second rotatable element for resetting the number wheels, a resetting mechanism comprising a rotary control unit drivingly connected to the first rotatable element of the counter, intermittent drive means between the rotary control unit and the second rotatable element, a reset motor, rotary means driven by the reset motor, disengageable clutch means disposed between the rotary means and the control unit, manual means for engaging the clutch and energizing the reset motor to initiate a resetting operation, and means for automatically releasing the clutch and deenergizing the reset motor at the termination of the resetting operation.

6. In combination with a counter having a first rotatable element for conditioning the counter alternately for a resetting operation and a registering operation and a second rotatable element for zeroizing the number wheels, an automatic resetting apparatus for the counter comprising a reset motor, a rotatable control unit drivingly connected to the first rotatable element of the counter, a rotatable member driven by the reset motor, a pawl and ratchet connection between the rotatable member and the control unit normally forming a driving connection therebetween, a movable stop normally engageable with the pawl at a predetermined rotated position of the control unit for disengaging the pawl and ratchet connection, manual means for momentarily moving the stop to nonengaging position to release the pawl, means for energizing the reset motor responsive to operation of the manual means, means responsive to the control unit for deenergizing the reset motor at said predetermined rotated position of the control unit, and combination locking and driving means mounted for rotation with the control unit, said last-named means being engageable with the second rotatable element of the counter to drive the element during an intermediate portion of the movement of the control unit and to lock the element against movement during the remaining movement of the control unit.

7. In combination with a counter having a first rotatable element for conditioning the counter alternately for a resetting operation and a registering operation and a second rotatable element for zeroizing the number wheels, an automatic resetting apparatus for the counter comprising power means, a gear train driven by the power means, a control unit connected to the first rotatable element for rotation therewith, a disengageable clutch normally connecting the gear train with the control unit, a plurality of control elements mounted for pivoting movement toward and away from the control unit, a first of said control elements being adapted to disengage the clutch at a predetermined rotated position of the control unit, a second of said control elements being connected to energize the power means, manual means for momentarily actuating the first control element to engage the clutch, a connection between the first and second control elements to effect simultaneous closing of the reset motor switch, means on the control unit for preventing return movement of the second control element except when the control unit is in said predetermined position, and interrupted gearing between the control unit and the second rotatable element of the counter to drive the latter during an intermediate portion of the movement of the control unit.

8. In combination with a counter having a first rotatable element for conditioning the counter alternately for a resetting operation and a registering operation and a second rotatable element for zeroizing the number wheels, an automatic resetting apparatus for the counter comprising a reset motor, a switch for the reset motor, a gear train driven by the reset motor, a control unit connected to the first shaft for rotation therewith, a disengageable clutch normally connecting the gear train with the control unit, a plurality of control elements mounted for movement toward and away from the control unit, a first of said control elements being adapted to disengage the clutch at a predetermined rotated position of the control unit, a second of said control elements being connected to the reset motor switch, manual means for momentarily actuating the first control element to release the pawl for engagement with the ratchet wheel, a one-way drive connection between the first and second control elements to effect simultaneous closing of the reset motor switch, means on the control unit for preventing return movement of the second control element except when the control unit is in said predetermined position, and means forming a driving connection between the control unit and said second rotatable element of the counter during an intermediate portion of the movement of the control unit.

9. In combination with a counter having a first shaft for conditioning the counter alternately for a resetting operation and a registering operation and a second shaft for zeroizing the number wheels, an automatic resetting apparatus for the counter comprising a reset motor, a switch for the reset motor, a gear train driven by the reset motor, a control unit connected to the first shaft for rotation therewith, a disengageable clutch connecting the gear train with the control unit, a plurality of levers mounted for pivoting movement toward and away from the control unit, a first of said levers being adapted to disengage the clutch at a predetermined rotated position of the control unit, a second of said levers being connected to the reset motor switch, manual means for momentarily pivoting the first lever to engage the clutch, a one-way drive between the first and second levers to effect simultaneous closing of the reset motor switch, means on the control unit for preventing return movement of the second lever except when the control unit is in said predetermined position, a gear segment mounted for rotation with the control unit, and a gear on the second shaft of the counter adapted to be driven by the gear segment during a portion of the movement of the control unit.

10. In combination with a counter having a first shaft for conditioning the counter alternately for a resetting operation and a registering operation and a second shaft for zeroizing the number wheels, an automatic resetting apparatus for the counter comprising a reset motor, a switch for the reset motor, a gear train driven by the reset motor, a control unit connected to the first shaft for rotation therewith, a disengageable clutch connection between the gear train and control unit, a plurality of control elements mounted for movement toward and away from the control unit, a first of said control elements being adapted to disengage the clutch connection at a predetermined rotated position of the control unit, a second of said control elements being connected to the reset motor switch, manual means for momentarily moving the first control element to engage the clutch connection, means interconnecting the first and second control elements to effect simultaneous closing of the reset motor switch, means on the control unit for preventing return movement of the second control element except when the control unit is in said predetermined position, and intermittent drive means between the control unit and the second shaft of the counter for rotating the second shaft during an intermediate portion of the movement of the control unit.

11. In combination with a counter having a first shaft for conditioning the counter alternately for a resetting operation and a registering operation and a second shaft for zeroizing the number wheels, an automatic resetting apparatus for the counter comprising a reset motor, a switch for the reset motor, a gear train driven by the reset motor, a control unit connected to the first shaft for rotation therewith, a pawl normally connecting the gear train and control unit, a plurality of control elements mounted for movement toward and away from the control unit, a first of said control elements being adapted to disengage the pawl at a predetermined rotated position of the control unit, a second of said control elements being connected to the reset motor switch, manual means for momentarily actuating the first control element to release the pawl, a one-way driving connection between the first and second control elements to effect simultaneous closing of the reset motor switch, means on the control unit for preventing return movement of the second control element except when the control unit is in said predetermined position, a gear segment and a diametrically arranged locking disc segment mounted for rotation with the control unit, and a gear and locking plate mounted on the second shaft of the counter for engagement sequentially with the gear segment and locking disc segment.

12. In combination with a counter having a first shaft for conditioning the counter alternately for a resetting operation and a registering operation and a second shaft for zeroizing the number wheels, an automatic resetting apparatus for the counter comprising a reset motor, a switch for the reset motor, a gear train driven by the reset motor, a control unit connected to the first shaft for rotation therewith, a pawl normally connecting the gear train and control unit, a plurality of levers mounted for movement toward and away from the control unit, a first of said levers being adapted to disengage the pawl at a predetermined rotated position of the control unit, a second of said levers being connected to the reset motor switch, manual means for momentarily actuating the first lever to release the pawl, a one-way driving connection between the first and second levers to effect simultaneous closing of the reset motor switch, means on the control unit for preventing return movement of the second lever except when the control unit is in said predetermined position, a gear segment and a diametrically arranged locking disc segment mounted for rotation with the control unit, and a gear and locking plate mounted on the second shaft of the counter for engagement sequentially with the gear segment and locking disc segment.

13. In combination with a counter having a first shaft for conditioning the counter alternately for a resetting operation and a registering operation and a second shaft for zeroizing the number wheels, an automatic resetting apparatus for the counter comprising a reset motor, a switch for the reset motor, a gear train driven by the reset motor, a control unit connected to the first shaft for rotation therewith, a pawl and ratchet wheel connection between the gear train and control unit, a plurality of levers mounted for pivoting movement toward and away from the control unit, a first of said levers being adapted to disengage the pawl and ratchet wheel connection at a predetermined rotated position of the control unit, a second of said levers being connected to the reset motor switch, manual means for momentarily pivoting the first lever to release the pawl for engagement with the ratchet wheel, a driving connection between the first and second levers to effect simultaneous closing of the reset motor switch, means on the control unit for preventing return movement of the second lever except when the control unit is in said predetermined position, a gear segment and a diametrically arranged locking disc segment mounted for rotation with the control unit, and a gear and locking plate mounted on the second shaft of the counter for engagement sequentially with the gear segment and locking disc segment.

14. In combination with a counter having a first shaft for conditioning the counter alternately for a resetting operation and a registering operation and a second shaft for zeroizing the number wheels, an automatic resetting apparatus for the counter comprising a reset motor, a switch for the reset motor, a gear train driven by the reset motor, a control unit connected to the first shaft for rotation therewith, a pawl and ratchet wheel connection between the gear train and control unit, a plurality of levers mounted for pivoting movement toward and away from the control unit, a first of said levers being adapted to disengage the pawl and ratchet wheel connection at a predetermined rotated position of the control unit, a second of said levers being connected to the reset motor switch, a third of said levers having means for connection to a pump motor switch, manual means for momentarily pivoting the first lever to release the pawl for engagement with the ratchet wheel, a pin and slot connection between the first and second levers to effect simultaneous closing of the reset motor switch, means on the control unit for preventing return movement of the second lever except when the control unit is in said predetermined position, means on the control unit for actuating the third lever prior to return of the control unit to said predetermined position, a gear segment and a diametrically arranged locking disc segment mounted for rotation with the control unit, and a gear and locking plate mounted on the second shaft of the counter for engagement sequentially with the gear segment and locking disc segment.

15. In combination with a counter having a first shaft for conditioning the counter alternately for a resetting operation and a registering operation and a second shaft for zeroizing the number wheels, an automatic resetting apparatus for the counter comprising a reset motor, a switch for the reset motor, a gear train driven by the reset motor, a control unit connected to the first shaft for rotation therewith, a pawl and ratchet wheel connection between the gear train and control unit, a plurality of levers mounted for pivoting movement toward and away from the control unit, a first of said levers being adapted to disengage the pawl and ratchet wheel connection at a predetermined rotated position of the control unit, a second of said levers being connected to the reset motor switch, a third of said levers having means for connection to a pump motor switch, manual means movable in one direction for momentarily pivoting the first lever to release the pawl for engagement with the ratchet wheel, means on the control unit to prevent movement of the manual means in the opposite direction except when the control unit is in said predetermined position, a pin and slot connection between the first and second levers to effect simultaneous closing of the reset motor switch when the first lever is pivoted, means on the control unit for preventing return movement of the second lever except when the control unit is in said predetermined position, means on the control unit for actuating the third lever prior to return of the control unit to said predetermined position, a gear segment and a diametrically arranged locking disc segment mounted for rotation with the control unit, and a gear and locking plate secured to the second shaft of the counter for engagement sequentially with the gear segment and locking disc segment.

16. In combination with a counter having a frame, and resetting means extending through the frame, a resetting mechanism comprising a rotary control member connected to the resetting means of the counter, a rotary drive member coaxial with the control member, a disengageable clutch between the drive member and control member, a housing detachably secured to the frame of the counter, a reset motor mounted in the housing having means for rotating the drive member, a reset motor switch mounted in the housing for energizing the reset motor, a pump motor switch mounted in the housing, and a plurality of levers responsive to the rotated position of the control member having means for connection to the said switches, said housing together with the reset motor and the said switches mounted therein being removable as a unit from the counter frame.

17. In a counter, first rotatable means movable in one direction for conditioning the counter alternately for resetting and for registering, second rotatable means for zeroizing the number wheels, means for turning the first rotatable means in said one direction through an angular distance sufficient to condition the counter in sequence for resetting and then registering, and interrupted gearing between the first rotatable means and the second rotatable means providing a driving connection between the first and second rotatable means effective for rotating the second rotatable means to zeroize the number wheels only while the counter is conditioned for resetting.

18. In a counter, first rotatable means having a cam connected thereto for conditioning the counter alternately for resetting and for registering when the first rotatable means is turned in one direction, second rotatable means for zeroizing the number wheels, power means for turning the first rotatable means in said one direction, means for limiting turning movement of the first rotatable means to an angular distance sufficient to condition the counter in sequence for resetting and then registering, and interrupted gearing providing a driving connection between the first rotatable means and the second rotatable means effective for rotating the second rotatable means only during that portion of the rotation of the first rotatable means which conditions the counter for resetting.

19. In a counter, a first rotatable shaft, means including a cam on said first rotatable shaft for conditioning the counter alternately for resetting and for registering when the shaft is turned in one direction, means for zeroizing the number wheels when the counter is conditioned for resetting including a second rotatable shaft, a reset motor for turning the first rotatable shaft, a manually operable switch for initiating operation of the reset motor, means for limiting turning movement of the first rotatable shaft to an angular distance sufficient to condition the counter in sequence for resetting and then registering including means for opening the reset motor switch at the completion of said turning movement, and interrupted gearing providing a driving connection between the first and second shaft effective for rotating the second shaft only during that portion of rotation of the first shaft which conditions the counter for resetting.

20. In a liquid dispensing apparatus of the type having a liquid dispensing line and flow initiating means for initiating the flow of liquid through said line, a counter operable in accordance with the flow of liquid through the line, a first rotatable member in said counter movable in one direction for conditioning the counter alternately for resetting and for registering, a second rotatable member in said counter for zeroizing the number wheels when the counter is conditioned for resetting, means for turning the first rotatable member in said one direction, means for limiting turning movement of the first rotatable member to an angular distance sufficient to condition the counter in sequence for resetting and then registering, interrupted gearing forming a driving connection between the first and second rotatable members effective for rotating the second rotatable member to zeroize the number wheels only during that portion of the rotation of the first rotatable member which conditions the counter for resetting, and means effective upon movement of the first rotatable member through said angular distance for actuating the flow initiating means.

21. In a liquid dispensing apparatus of the type having a liquid dispensing line and flow initiating means for initiating the flow of liquid through said line, a counter operable in accordance with the flow of liquid through the line, a first rotatable member in said counter movable in one direction for conditioning the counter alternately for resetting and for registering, a second rotatable member in said counter for zeroizing the number wheels when the counter is conditioned for resetting, a reset motor for turning the first rotatable member in said one direction, a manually operable switch for initiating operation of the reset motor, means for limiting turning movement of the first rotatable member to an angular distance sufficient to condition the counter in sequence for resetting and then registering including means for opening the switch at the completion of turning movement of the first rotatable member through said angular distance, interrupted gearing forming a driving connection between the first and second rotatable members effective for rotating the second rotatable member to zeroize the number wheels only during that portion of the rotation of the first rotatable member which conditions the counter for resetting, and means effective upon movement of the first rotatable member through said angular distance for actuating the flow initiating means.

References Cited in the file of this patent
UNITED STATES PATENTS

| 2,626,082 | Bliss et al. | Jan. 20, 1953 |
| 2,814,444 | Bliss | Nov. 26, 1957 |
| 2,946,505 | Davis | July 26, 1960 |